(12) United States Patent
Fossum et al.

(10) Patent No.: US 8,373,782 B2
(45) Date of Patent: Feb. 12, 2013

(54) IMAGE SENSOR INCLUDING NOISE REMOVING UNIT, IMAGE PICKUP DEVICE HAVING THE IMAGE SENSOR, AND IMAGE SENSING METHOD PERFORMED IN THE IMAGE SENSOR

(75) Inventors: Eric Fossum, Wolfeboro, NH (US); Kyoung Lae Cho, Suwon-si (KR); Yoon Dong Park, Yongin-si (KR); Young Gu Jin, Hwasung-si (KR); Seung Hoon Lee, Yongin-si (KR); Sung-Jae Byun, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 243 days.

(21) Appl. No.: 12/662,673

(22) Filed: Apr. 28, 2010

(65) Prior Publication Data

US 2010/0277622 A1 Nov. 4, 2010

(30) Foreign Application Priority Data

Apr. 29, 2009 (KR) ........................ 10-2009-0037644

(51) Int. Cl.
*H04N 3/14* (2006.01)
*H04N 5/335* (2011.01)
(52) U.S. Cl. ........ 348/294; 348/164; 348/241; 348/307; 250/208.1

(58) Field of Classification Search .................. 348/164, 348/241, 294–310; 250/208.1
See application file for complete search history.

(56) References Cited

U.S. PATENT DOCUMENTS

| 6,888,122 | B2 * | 5/2005 | Fossum ...................... 250/208.1 |
| 7,800,672 | B1 * | 9/2010 | Graham et al. ............... 348/307 |
| 8,059,173 | B2 * | 11/2011 | Walschap et al. ............. 348/241 |
| 2004/0036784 | A1 * | 2/2004 | Bock .............................. 348/308 |
| 2007/0091175 | A1 | 4/2007 | Iddan et al. |
| 2008/0094483 | A1 * | 4/2008 | Fossum ...................... 348/222.1 |
| 2008/0186394 | A1 * | 8/2008 | Panicacci ..................... 348/308 |

FOREIGN PATENT DOCUMENTS

| JP | 2004-029141 | 1/2004 |
| KR | 10-2003-0017974 | 3/2003 |
| KR | 10-2004-0028919 | 4/2004 |

* cited by examiner

*Primary Examiner* — Anthony J Daniels
(74) *Attorney, Agent, or Firm* — Harness, Dickey & Pierce, P.L.C.

(57) ABSTRACT

An image sensor including a noise removing unit may sense images accurately by measuring the amount of noise generated when the image sensor does not perform a sensing operation, storing information about the measured noise amount in each pixel, and removing photocharge corresponding to the information about the measured noise amount during image sensing.

13 Claims, 12 Drawing Sheets

IMAGE SENSOR INCLUDING NOISE REMOVING UNIT, IMAGE PICKUP DEVICE HAVING THE IMAGE SENSOR, AND IMAGE SENSING METHOD PERFORMED IN THE IMAGE SENSOR

CROSS-REFERENCE TO RELATED APPLICATIONS

This application claims priority under 35 U.S.C. §119 to Korean Patent Application No. 10-2009-0037644, filed on Apr. 29, 2009, in the Korean Intellectual Property Office (KIPO), the entire contents of which are incorporated herein by reference.

BACKGROUND

The present invention relates to image sensing technology, and more particularly, to an image sensor capable of more accurately sensing images by removing a photocharge element corresponding to noise within a pixel, and an image pickup device including the image sensor.

Image sensors are semiconductor devices that convert an optical image into an electrical signal, and may be roughly classified into charge coupled device (CCD) image sensors and CMOS image sensors (CISs).

The image sensors may convert an optical signal detected from each of a plurality of photo sensitive elements (for example, photodiodes) arranged in a two-dimensional matrix into an electrical signal to generate an image. However, the image may include predetermined noise due to factors such as the quality of image sensors or the amount of peripheral light of the environment where an optical signal is detected, and the noise may be an important cause of degradation of the quality of the image. In other words, since photocharge as much as the amount of noise may be generated in photo sensitive elements included in an image sensor, and the noise generates problems such as degradation of the quality of image, means for efficiently removing a noise component is needed.

SUMMARY

The present invention provides an image sensor capable of more accurately sensing images by effectively removing a noise component from light supplied from each pixel, and an image pickup device including the image sensor.

According to an aspect of the present invention, there is provided an image sensor including a photo sensitive device (PSD) for generating photocharges; and a noise removing circuit connected to the PSD, for removing photocharge corresponding to a noise component from among photocharges generated in the PSD. The noise removing circuit may include a storage unit for sampling and storing the photocharge corresponding to the noise component; and a noise removing unit for adjusting the noise component stored in the storage unit from among the photocharges generated in the PSD based on the sampled photocharge stored in the storage unit, through an on/off control signal.

The image sensor may include a plurality of pixels, and the noise removing circuit may be installed in each of the plurality of pixels or may be shared by pixels from among the plurality of pixels. The storage unit may include at least one capacitor for storing the photocharge corresponding to the noise component. The noise removing unit may include at least one transistor that is turned on/off in response to a control signal.

The noise removing unit may include a first transistor for turning on/off a path between the PSD and the storage unit in response to the control signal; and a second transistor electrically coupled to the first transistor, for adjusting the amount of current in response to a magnitude of a voltage applied to the storage unit. The control signal may be enabled during a period of time that is the same as a unit time during which a sensing operation is performed in the image sensor.

According to another aspect of the present invention, there is provided an image pickup device including an image sensor including a plurality of pixels; a central processing unit (CPU) for controlling an operation of the image sensor; and a memory device for storing an image provided from the image sensor under the control of the CPU. Each of the plurality of pixels may include a PSD for generating photocharges; and a noise removing circuit connected to the PSD, for removing photocharge corresponding to a noise component from among photocharges generated in the PSD. The noise removing circuit may include a storage unit for sampling and storing the photocharge corresponding to the noise component; and a noise removing unit for adjusting the noise component stored in the storage unit from among the photocharges generated in the PSD based on the sampled photocharge stored in the storage unit, through an on/off control signal.

According to another aspect of the present invention, there is provided an image sensing method including detecting and storing photocharge corresponding to a noise component; and sensing an image by adjusting the photocharge corresponding to the noise component. The detecting and storing of the photocharge corresponding to the noise component may include forming a path that allows the photocharge corresponding to the noise component to flow during a first time from among a time during which a sensing operation of the image sensor is not performed; and storing the photocharge corresponding to the noise component transferred along the path in a capacitor, wherein the first time is the same as a unit time during which the sensing operation of the image sensor is performed.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
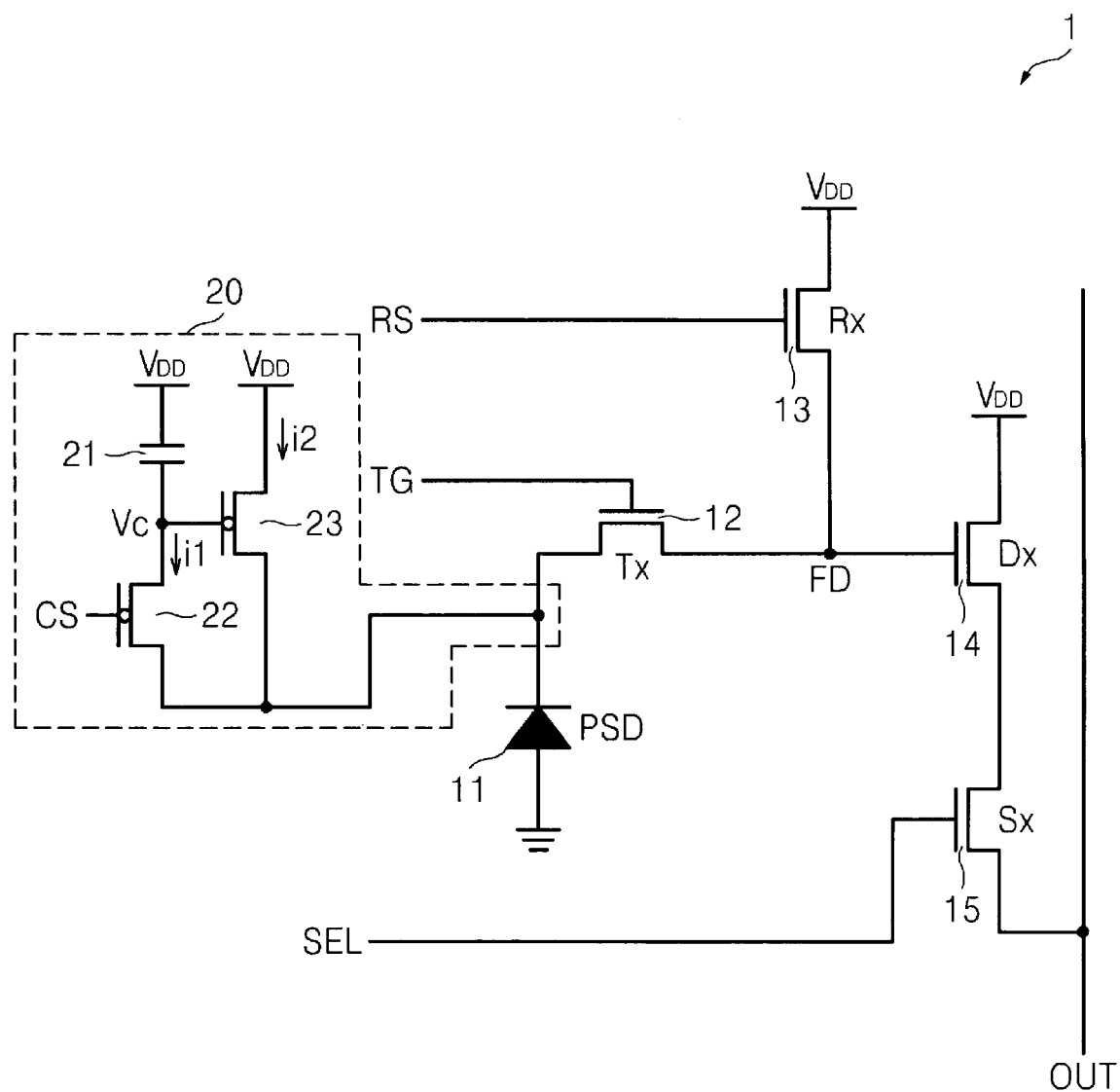
FIG. 1 is a circuit diagram of a unit pixel of an image sensor, according to an embodiment of the present invention.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a circuit diagram of a unit pixel 1 of an image sensor, according to an embodiment of the present invention. Examples of an image sensor according to an embodiment of the present invention may include all sensing units capable of sensing images, such as, a charge coupled device (CCD) image sensor, a CMOS image sensor (CIS), a 3D image sensor, a depth sensor, etc. For a convenience of explanation, the CIS is illustrated as the image sensor of FIG. 1.

The unit pixel 1 of the image sensor may include a photo sensitive device (PSD) 11 and a noise removing circuit 20. The PSD 11 may receive light from an external source and generate photocharge on the basis of the received light. For example, the PSD 11 may include at least one of a photodiode (PD), a photo transistor, a photo gate, a pinned photo diode (PPD), or a combination thereof.

When describing an operation of the unit pixel 1 in detail, the photocharge generated in the PSD 11 may be transmitted to a floating diffusion region FD in response to a gating operation of a transfer transistor (Tx) 12. When a transfer control signal TG has a second level (for example, a high level), the transfer transistor 12 may be turned on, and the photocharge generated in the PSD 11 may be transmitted to the floating diffusion region FD.

A drive transistor (Dx) 14 may serve as a source follower buffer amplifier and buffer a signal corresponding to charge with which the floating diffusion region FD is charged. A select transistor (Sx) 15 may perform a switching operation and an addressing operation in order to select a unit pixel in response to a select control signal SEL. A reset transistor (Rx) 13 may reset the floating diffusion region FD in response to a reset control signal RS. The reset signal RS and select control signal SEL are generated by, for example, a timing generator 218. The timing generator 218 will be discussed in greater detail below with reference to FIG. 4.

The reset operation on the floating diffusion region FD is performed for correlated double sampling (CDS). The CDS is necessarily applied to remove fixed pattern noise and an offset, and may be implemented in various methods such as an analog method, a digital method, and an analog-digital mixed method.

Although FIG. 1 illustrates the unit pixel 1 including the single PSD 11 and four MOS transistors, namely, the transfer transistor 12, the reset transistor 13, the drive transistor 14, and the select transistor 15, an embodiment of the present invention is not limited thereto. An embodiment of the present invention may be applied to any circuit including a PSD and at least three transistors including a transfer transistor 12 and a source follower buffer amplifier 14.

An operation of the unit pixel 1 of the image sensor will now be described in detail. First, the unit pixel 1 of the image sensor may be reset by turning on the reset transistor 13, the transfer transistor 12, and the select transistor 15. The PSD 11 accumulates photocharge therein, and the floating diffusion region FD accumulates photocharge in proportion to the magnitude of a supplied voltage $V_{DD}$.

Thereafter, the transfer transistor 12 is turned off, and the select transistor 15 is turned on. At this time, the reset transistor 13 is turned off. In this state, a first output voltage is read from an output terminal OUT, and the value of the read first output voltage is stored in a buffer (not shown).

Then, the transfer transistor 12 is turned on so that the photocharges generated by the PSD 11 may be moved to the floating diffusion region FD according to the intensity of light. A second output voltage is read from the output terminal OUT, and analog data associated with a difference between the first and second output voltages is changed to digital data. In this way, a cycle of the operation of the unit pixel 1 may be completed. The CDS operation may be performed using the buffer. Alternatively, the CDS operation may be performed at the same time when the two voltages are sequentially output via a capacitor (not shown).

While light is collected and photocharge is generated in the PSD 11, photocharge corresponding to noise may be included in the generated photocharge. This may impede accurate image sensing. In particular, in a 3D image sensor including an infrared (IF) light emitting device, noise components of solar light or the like are significantly greater than those of reflection light, and thus a predetermined compensation unit needs to compensate for the noise components.

Thus, the unit pixel 1 according to the present embodiment may further include the image removing circuit 20 for removing a photocharge component corresponding to noise. As illustrated in FIG. 1, the image removing circuit 20 may be connected to the PSD 11 to provide a path that prevents a part of the photocharge generated in the PSD 11 from being transmitted to the floating diffusion region FD.

The image removing circuit 20 may prevent photocharge corresponding to noise from among the photocharge generated in the PSD 11 from being transmitted to the floating diffusion region FD.

Figure 2:
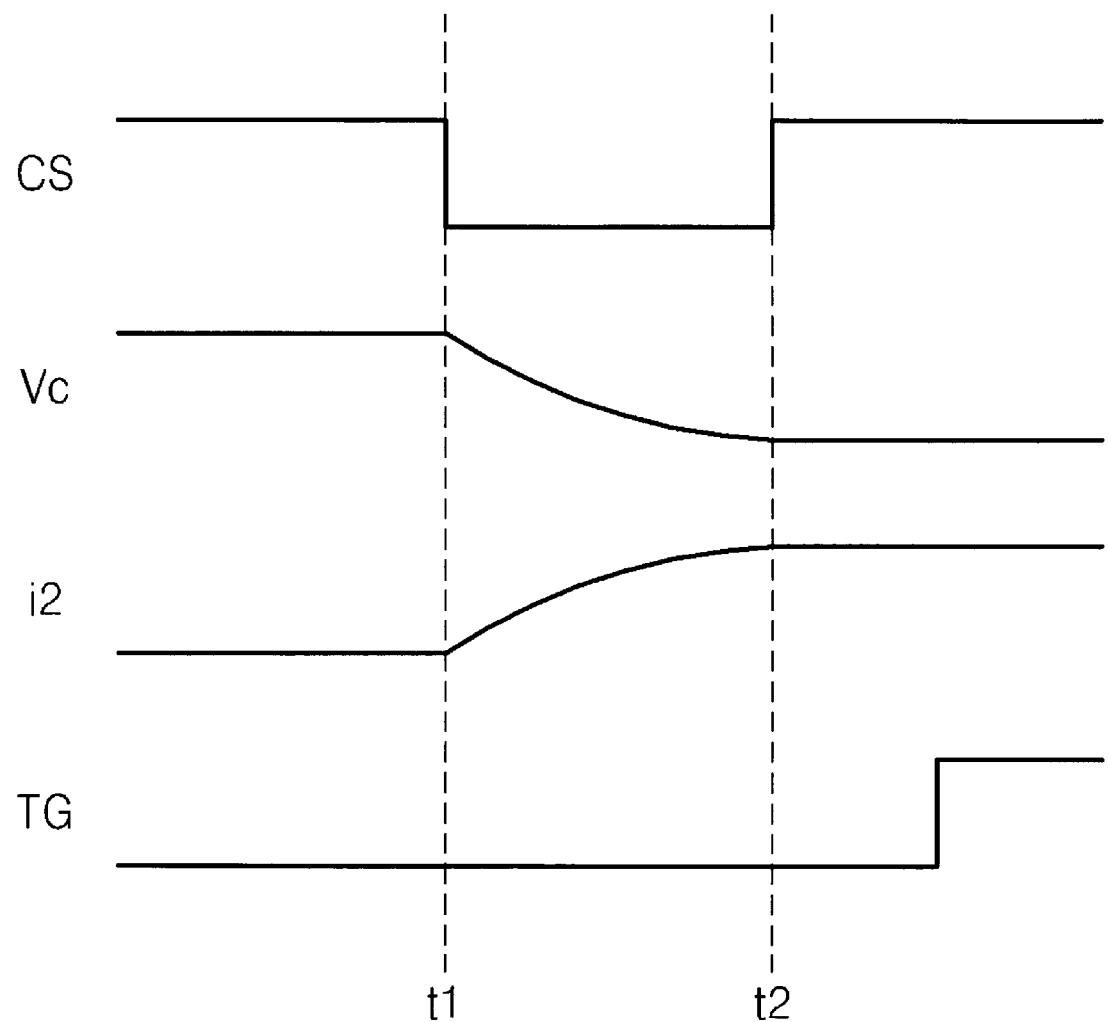
FIG. 2 is a timing diagram for explaining an operation of an image sensor according to an embodiment of the present invention.

The operation of the image removing circuit 20 will be described later in detail with reference to the circuit diagram of the unit pixel 1 illustrated in FIG. 1 and a timing diagram illustrated in FIG. 2. Since the image removing circuit 20 needs to store noise and adjust the noise through suitable control, the image removing circuit 20 includes a capacitor and a plurality of transistors in the embodiment of FIG. 1. Although the image removing circuit 20 includes the capacitor and the plurality of transistors in the present embodiment of FIG. 1, the image removing circuit 20 may include other components having the same functions as those of the capacitor and the transistors.

In addition, although the image removing circuit 20 is included in each unit pixel 1 in the present embodiment of FIG. 1, a plurality of unit pixels 1 may share a single image removing circuit, and the entire pixel array may share a single image removing circuit or a group of image removing circuits.

A structure and an operation of the image removing circuit 20 will now be described with reference to FIG. 2. Referring to FIGS. 1 and 2, the image removing circuit 20 may include a capacitor 21 for accumulating photocharge corresponding to a noise component, a first transistor 22 which is connected between the capacitor 21 and the PSD 11 and turned on/off in response to a control signal CS, and a second transistor 23 which is connected between supply voltage line and the PSD 11 and adjusts the amount of flow of the photocharge generated by the PSD 11 in response to a voltage applied to the capacitor 21. The control signal CS is generated by, for example, the timing generator 218 illustrated in FIG. 4.

The control signal CS for controlling the first transistor 22 may be activated when a sensing operation of an image sensor is not performed. As illustrated in FIG. 2, the first transistor 22 may be turned on during a period of time (for example, t1~t2) when the transfer control signal TG is inactive. In other words, when the image sensor does not operate, only photocharge corresponding to noise may be generated in the PSD 11. Thus, the magnitude of the photocharge corresponding to noise may be sampled by the image removing circuit 20 and represented by the first photocurrent i1.

In more detail, the first transistor 22 may be turned on in response to the control signal CS at a point in time (for example, t1 in FIG. 2) when the image sensor does not operate. In some embodiments, the period of time (for example, t1~t2 of FIG. 2) when the first transistor 22 is turned on may be equal to a unit time of a sensing operation performed in the image sensor. Thus, the amount of noise generated per unit time may be accurately measured.

When the first transistor 22 is turned on, the amount of second photocurrent i2 flowing through the second transistor 23 may be controlled to be substantially equal to the amount of photocurrent generated due to noise. At this time, the voltage applied to the capacitor 21 may be controlled so that the two photocurrents have the same amounts. In more detail, the two photocurrents may be controlled to have the same amounts by a gate voltage Vc of the second transistor 23. In other words, the photocharges generated by the PSD 11 may be accumulated in the one end of the capacitor 21, and the gate voltage Vc of the second transistor 23 may be lowered by the accumulated photocharge, so that the amount of photocurrent i2 flowing through the second transistor 23 may be controlled to be equal to the amount of photocurrent generated due to noise.

Then, when the first transistor 22 is turned off at the point in time t2, the second photocurrent i2 flowing through the second transistor 23 may be maintained by the voltage applied to the capacitor 21 (that is, the gate voltage Vc of the second transistor 23). Thus, when the sensing operation of the image sensor resumes, photocharge corresponding to noise from among the photocharges generated by the PSD 11 may be slipped out through the second transistor 23, and consequently photocharges from which noise has been removed may be transmitted to the floating diffusion region FD. The above-described noise measuring operation may be performed every frame, or may be performed on one of a plurality of frames.

As illustrated in FIG. 1, the noise removing circuit 20 self-removes the noise generated per unit pixel 1 without undergoing special image signal processing (ISP) as post processing, thereby increasing the efficiency of image sensing.

As described above, while the sensing operation of the image sensor is not being performed, the above-described noise accumulation may be performed. Since the second transistor 23 is appropriately turned on in response to the photocharge corresponding to noise, which is accumulated in the capacitor 21, the photocharge corresponding to noise from among the photocharges generated by the PSD 11 may be removed by the second transistor 23.

Figure 3A:
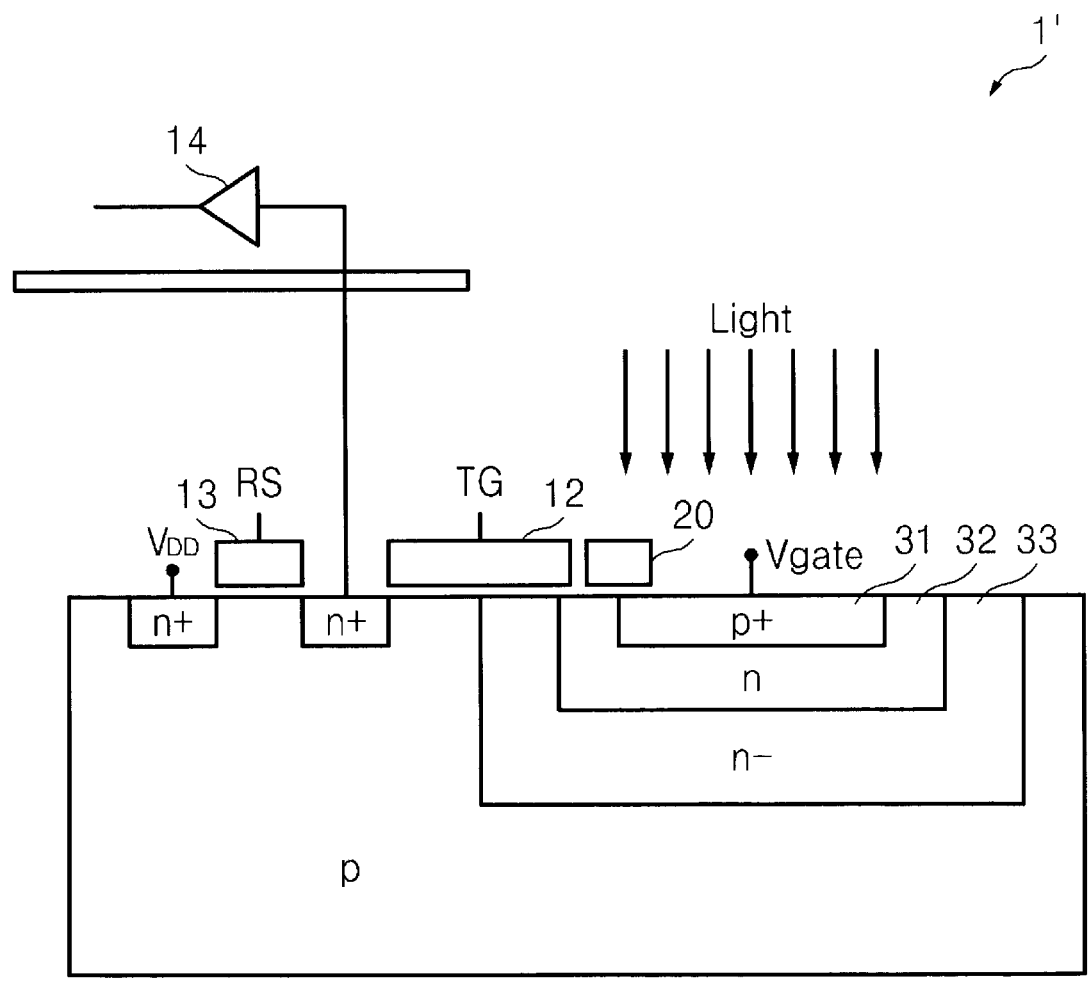
FIGS. 3A and 3B are cross-sectional views of unit pixels of an image sensor, according to other embodiments of the present invention.
Figure 3B:
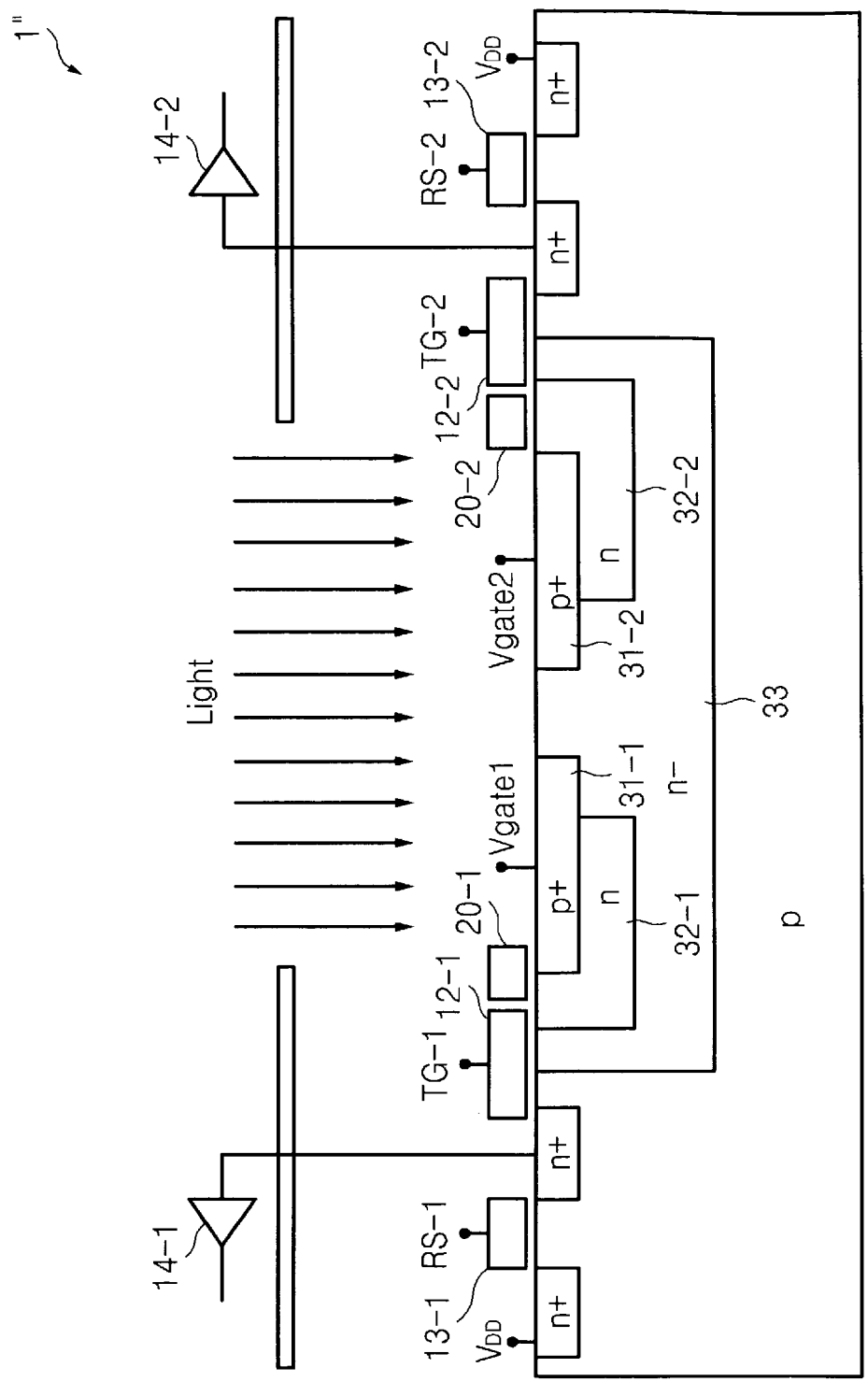

FIGS. 3A and 3B are cross-sectional views of unit pixels 1' and 1" of an image sensor, respectively, according to other embodiments of the present invention. Referring to FIGS. 1 through 3B, an embodiment of the present invention may be applied to an image sensor having a PN junction structure illustrated in FIGS. 3A and 3B. A gating region 31 doped with p+ type impurities may control a photocharge generation region 32 doped with n type impurities to generate photocharge, in response to a gating voltage Vgate.

For example, when the gating voltage Vgate for controlling the gating region 31 has a second level (for example, a high level), the photocharge generation region 32 may generate photocharges in response to incident light. In some embodiments, the photocharges may be provided to a photocharge storage region 33 doped with n-type impurities.

The photocharges generated in this way may be accumulated in the floating diffusion region FD and transmitted to an output terminal via the transfer transistor 12 and an amplifier 14, and the floating diffusion region FD may be reset by the reset transistor 13. The amplifier 14 may correspond to the drive transistor 14 of FIG. 1. According to the method described above with reference to FIG. 1, the noise removing circuit 20 may provide a path through which photocharge corresponding to noise from among the photocharges generated in the photocharge generation region 32 are escaped.

An embodiment of the present invention may be applied to the unit pixel 1" of a 3D image sensor having a PN junction structure illustrated in FIG. 3B. A 3D image sensor may receive light reflected by an object from among light emitted from a light source (for example, IR). The unit pixel 1" of the 3D image sensor may include two sub pixels, and a distance between the object and a difference between the amounts of photocharges generated by the two sub pixels is measured to thereby form a 3D image.

Gating regions 31-1 and 31-2 of the two sub pixels, respectively, may be gated by gating voltages Vgate1 and Vgate2, respectively, having a phase difference of 180 degrees therebetween, and either the gating voltage Vgate1 or Vgate2 may have the same phase as that of the light emitted from the light source. Operations and structures of the gating regions 31-1 and 31-2, photocharge generation regions 32-1 and 32-2, a photocharge storage region 33, transfer transistors 12-1 and 12-2, reset transistors 13-1 and 13-2, amplifiers 14-1 and 14-2, and image removing circuits 20-1 and 20-2 are substantially the same as described above with reference to FIGS. 1 and 3A, so a detailed description thereof will be omitted.

Figure 4:
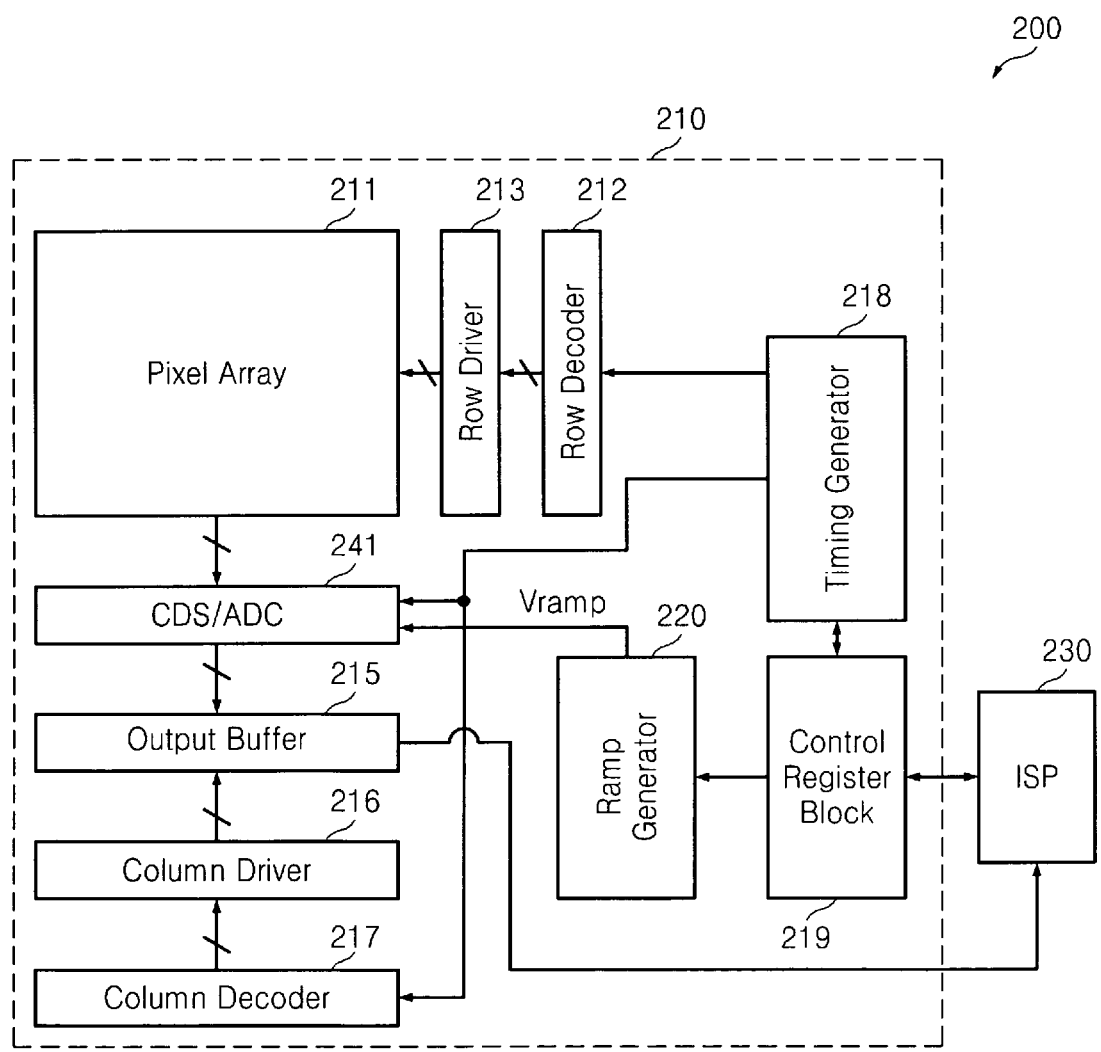
FIG. 4 is a schematic block diagram of an image sensor according to an embodiment of the present invention.

FIG. 4 is a schematic block diagram of an image sensor 200 according to an embodiment of the present invention.

Referring to FIGS. 1 through 4, the image sensor 200 according to the present embodiment may include a photoelectric conversion unit 210 and an image signal processor (ISP) 230. The photoelectric conversion unit 210 and the ISP 230 may be implemented into separate chips or modules. The photoelectric conversion unit 210 and the ISP 230 may be implemented into a single chip such as a System on Chip (SoC).

The photoelectric conversion unit 210 may generate an image signal associated with an object on the basis of incident light. The photoelectric conversion unit 210 may include a pixel array 211, a row decoder 212, a row driver 213, a CDS/analog to digital conversion (ADC) device 241, an output buffer 215, a column driver 216, a column decoder 217, a timing generator 218, a control register block 219, and a ramp signal generator 220.

The pixel array 211 may include a plurality of unit pixels 1, 1' or 1" of FIG. 1, 3A, or 3B. The unit pixels may form a matrix in which a plurality of row lines are connected to a plurality of column lines.

The row decoder 212 may decode a row control signal (for example, an address signal) generated in the timing generator 218. The row driver 213 may select at least one from a plurality of row lines (not shown) that constitute the pixel array 211, in response to the decoded row control signal.

The CDS/ADC device 241 may generate a sampling signal (not shown) by performing CDS with respect to a pixel signal output from a unit pixel connected to one of a plurality of column lines (not shown) that constitute the pixel array 211, and compare the sampling signal with a ramp signal Vramp to output a digital signal corresponding to a result of the comparison. Further the CDS/ADC device 241 may include elements for performing ADC functions as will be discussed in greater detail with reference to FIGS. 5A-5C and 6A-6C The output buffer 215 may buffer and output signals received from the CDS block 214, in response to a column control signal (for example, an address signal) output from the column driver 216.

The column driver 216 may selectively activate at least one of the column lines of the pixel array 211, in response to a decoded column control signal (for example, an address signal) output from the column decoder 217. The column decoder 217 may decode a column control signal (for example, an address signal) generated by the timing generator 218.

The timing generator 218 may generate at least one control signal for controlling at least one of the pixel array 211, the row decoder 212, the output buffer 215, the column decoder 217, and the ramp signal generator 220, on the basis of a command output from the control register block 219.

The control register block 219 may generate various commands for controlling the components of the photoelectric conversion unit 210. The ramp signal generator 220 may output the ramp signal Vramp to the CDS/ADC device 241 in response to a command output from the control register block 219. The ISP 230 may generate an image corresponding to the object on the basis of pixel signals output from the photoelectric conversion unit 210.

Figure 5A:
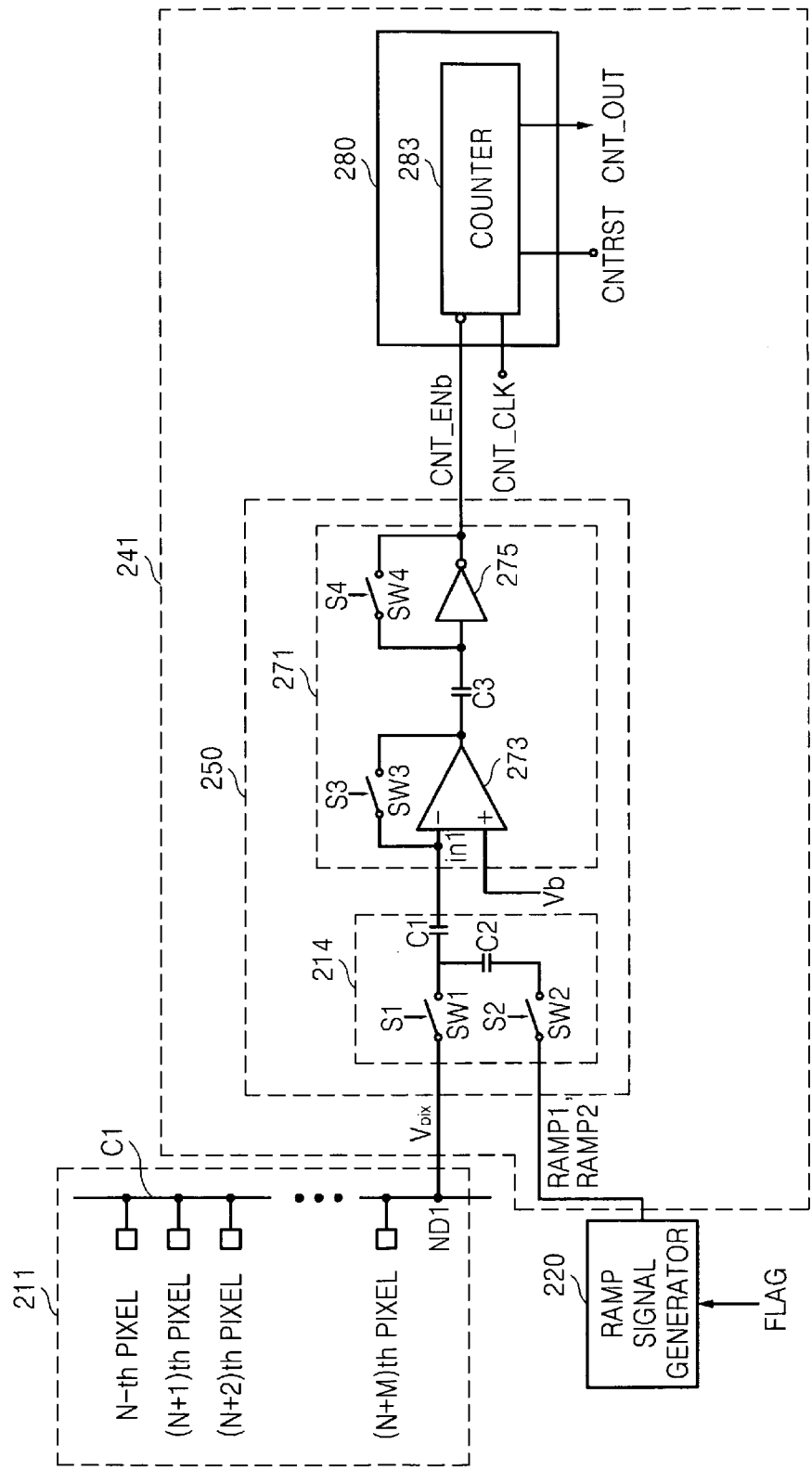
FIGS. 5A through 5C are circuit diagrams of an image pickup device according to an embodiment of the present invention.
Figure 5B:
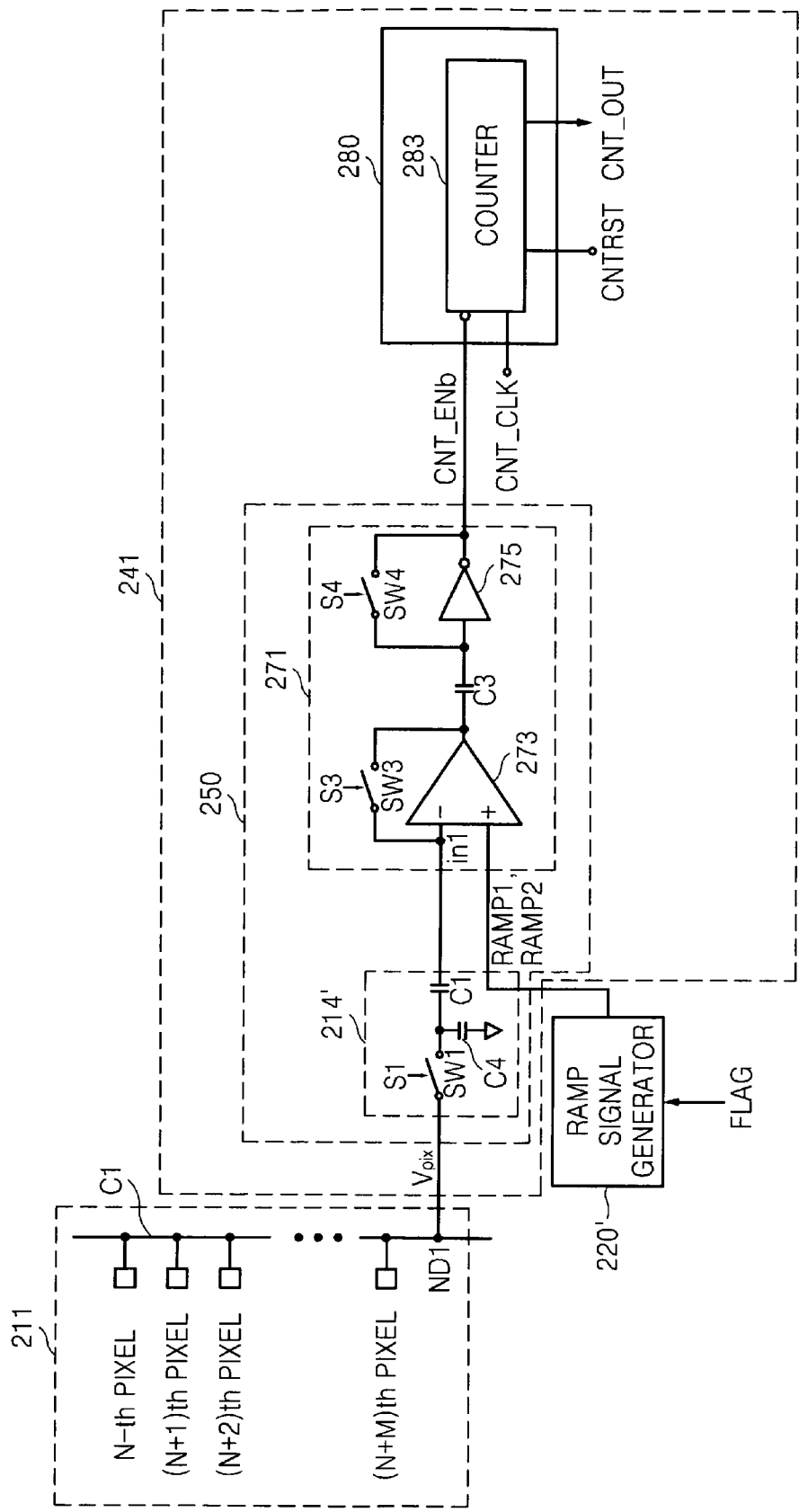
Figure 5C:
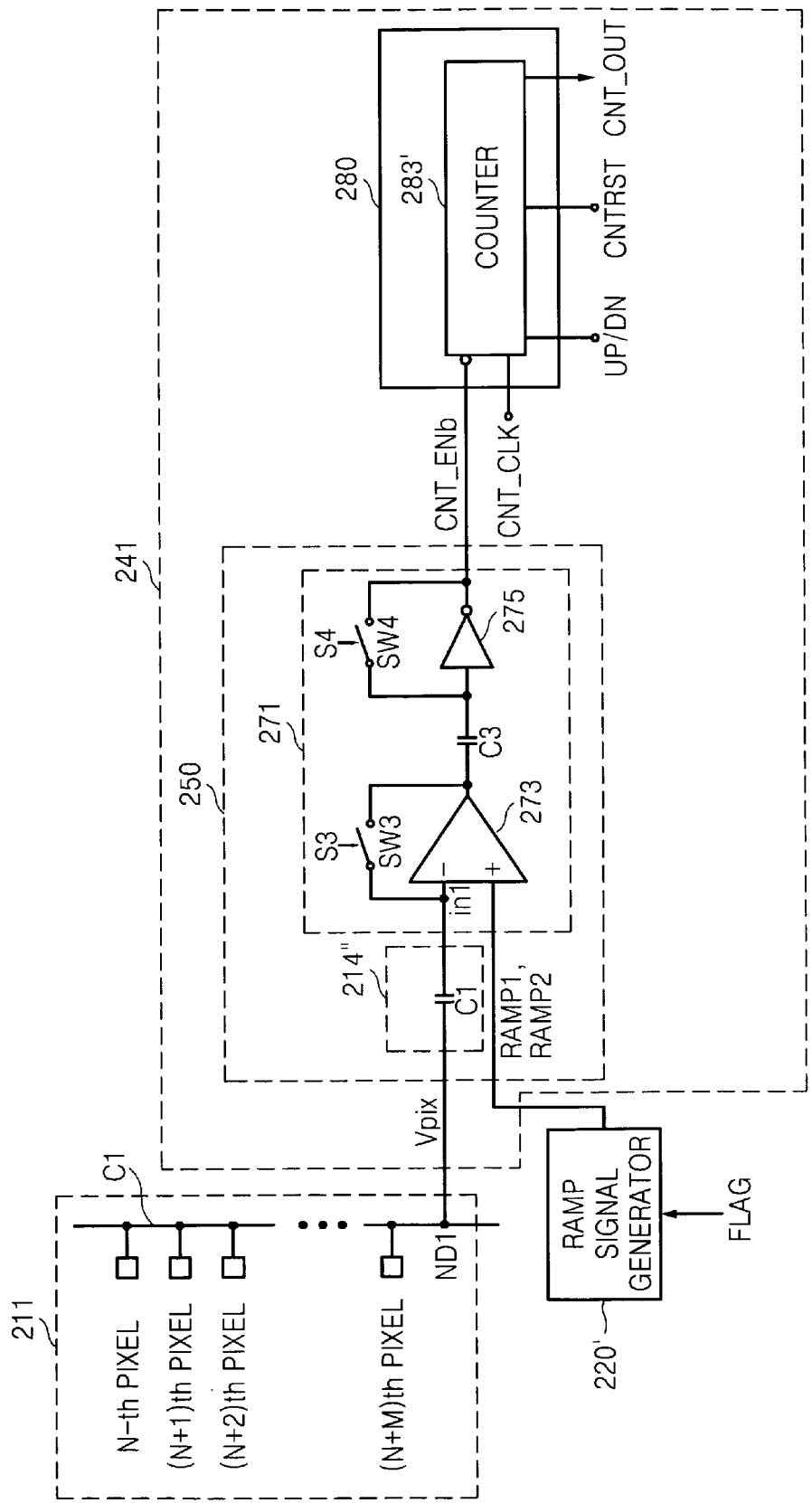

FIGS. 5A through 5C are circuit diagrams of an image pickup device according to an embodiment of the present invention. Although not shown in FIG. 4, the pixel array 211 may convert analog signals generated from at least one pixel selected by the row decoder 212 and the column decoder 217, namely, a reset signal and an image signal, into digital signals. To achieve this, the image pickup device according to the present embodiment may further include a CDS/ADC device 241.

An operational mode (for example, a normal mode or an average mode) of the image pickup (or capture) device according to the present embodiment may be variously set on the basis of an operation of setting a flag FLAG according to a user's selection or an operation of driving the image pickup (or capture) device such as a digital camera.

For example, the timing generator 218 may generate a control signal for controlling the operational mode of the CDS/ADC device 241 on the basis of the flag FLAG or the driving operation. For example, when the image pickup device 10 operates in a normal mode, the pixel array 211 may output image signals output from all pixels to the CDS/ADC device 241 to thereby display an image with a high resolution.

An ADC block 250 may convert an analog signal output from each of the pixels into a digital signal and generate the digital signal or a CDS signal generated by performing CDS on the digital signal. For example, if the ADC block 250 performs an analog CDS operation, the ADC block 250 may include a CDS circuit 214, 214', or 214" of FIG. 5A, 5B, or 5C for performing analog CDS on a signal output from each of the pixels, and an analog-to-digital converter (ADC) 271 for converting an analog signal output from the CDS circuit 214, 214', or 214" of FIG. 5A, 5B, or 5C into a digital signal.

Figure 6A:
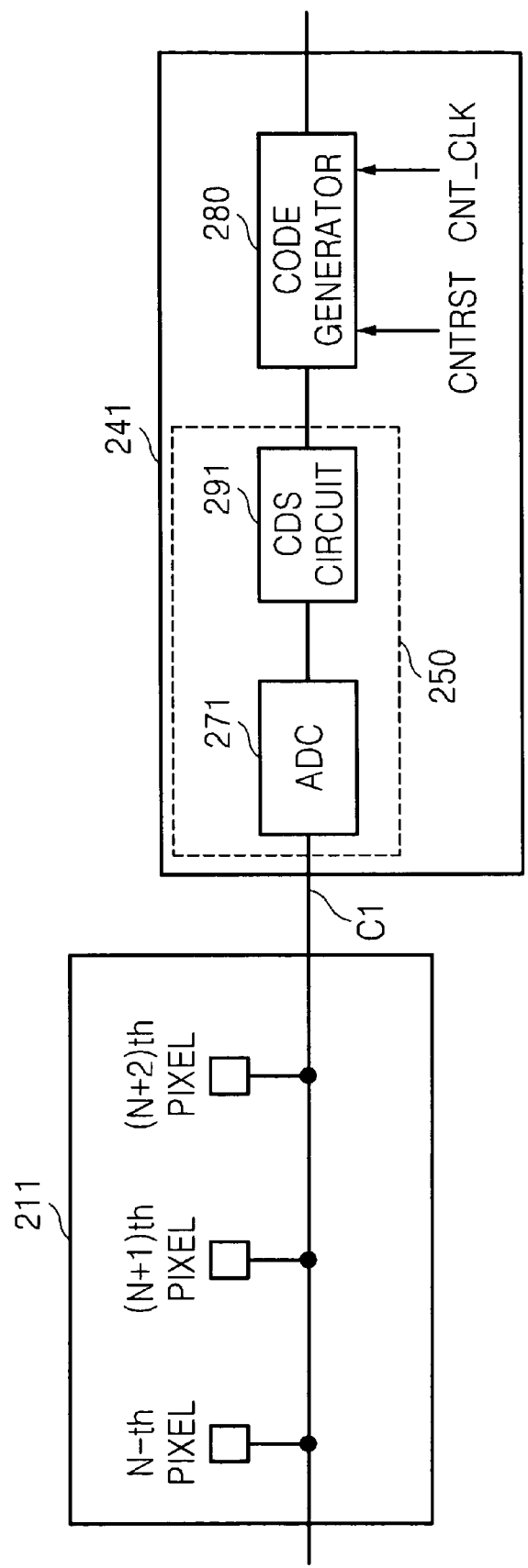
FIGS. 6A through 6C are circuit diagrams of an image pickup device according to another embodiment of the present invention.

On the other hand, if the ADC block 250 performs a digital CDS operation, the ADC block 250 may include an ADC 271 for converting an analog signal output from each pixel into a digital signal, and a CDS circuit 291 for performing digital CDS on the digital signal output from the ADC 271, as illustrated in FIG. 6A.

The ADC block 250 may include a sigma-delta ADC, a successive approximation ADC, a cyclic ADC, or a pipe lined ADC.

FIG. 5A is a circuit diagram of an image pickup device including the pixel array 211, the CDS/ADC device 241, and the ramp signal generator 220 according to an embodiment of the present invention. The image pickup (or capture) device of FIG. 5A may include a single slope ADC. Referring to FIG. 5A, the pixel array 211 may include a plurality of pixels, namely, N-th through (N+M)th pixels, connected to a single column C1. Here, N and M denote natural numbers.

The CDS/ADC device 241 may include an ADC block 250 and a code generator 280. The ADC block 250 may convert a first analog signal output from a first pixel (for example, the N-th pixel) into a first digital signal and convert a second analog signal output from a second pixel (for example, an (N+1)th or (N+2)th pixel) into a second digital signal.

The code generator 280 counts the number of clock signals CNT_CLK until the logic state of a first signal CNT_ENb associated with at least a part of the first digital signal is transited, generates a first digital code CNT_OUT as a result of the counting, and holds (or latches) the first digital code CNT_OUT corresponding to when the logic state of the first signal CNT_ENb is transited. The code generator 280 also may generate a digital code CNT_OUT from the held first digital code in response to the clock signal CNT_CLK, until the logic state of a second signal CNT_ENb associated with at least a part of the second digital signal is transited.

The ramp signal generator 220 may generate a first ramp signal RAMP1 having a first inclination (or slope) in response to the flag FLAG. The flag FLAG is an example of a control signal for controlling the inclination of a ramp signal. Alternatively, the flag FLAG may be the control signal for operating the CDS/ADC device 241 in a normal mode or an average mode.

A counter 283 of the code generator 280 may perform (or proceed with) a count operation in response to an enable signal CNT_ENb having a first level, stop the count operation in response to the enable signal CNT_ENb having a second level, and perform a reset operation or an initialization operation in response to a reset signal CNTRST.

The CDS circuit 214 may include a plurality of switches, namely, switches SW1 and SW2 controlled by signals S1 and S2, respectively, and a plurality of capacitors, namely, capacitors C1 and C2. Signals S1 and S2 may be generated by the timing generator 218. The CDS circuit 214 may perform CDS on a reset signal and an image signal output from the first pixel (for example, the N-th pixel) to generate a correlated double sampled analog signal in1.

The ADC 271 may include a comparator 273, an inverter 275, a capacitor C3, and a plurality of switches, namely, switches SW3 and SW4 controlled by signals S3 and S4, respectively, compare the correlated double sampled analog signal in1 with a reference signal Vb, and generate an enable signal CNT_ENb corresponding to a result of the comparison. Signals S3 and S4 may be generated by the timing generator 218. The reference signal Vb may be a direct current (DC) signal having a constant level. Although the ADC 271 including an inverter 275 is illustrated in FIG. 5A, the inverter 275 may not be included in some embodiments.

The clock signal CNT_CLK may be supplied to the counter 283 of the code generator 280 from when the first ramp signal RAMP1 generated by the ramp signal generator 220 starts a ramp, for example, an upward ramp.

At this time, the counter 283 starts counting the number of either rising edges or falling edges of the clock signal CNT_CLK (hereinafter, referred to as the number of clock signals CNT_CLK), in response to the enable signal CNT_ENb having a first level (for example, a low level). The comparator 273 starts comparing the level of the reference signal Vb received via a first input terminal (for example, a (+) input terminal) with the level of the correlated double sampled analog signal in1 received via a second input terminal (for example, a (−) input terminal).

Since the inverter 275 connected to the comparator 273 supplies the enable signal CNT_ENb having the first level to the counter 283 until a transition point in time, the counter 283 may count the number of clock signals CNT_CLK and output a digital code CNT_OUT corresponding to a count value. The digital code CNT_OUT may be a K-bit (where K denotes a natural number) count value.

As the first ramp signal RAMP1 performs an upward ramp, the level of the first ramp signal RAMP1 increases, and thus the level of the correlated double sampled analog signal in1 input to the second input terminal increase. Thus, when the level of the correlated double sampled analog signal in1 is equal to or greater than the level of the reference signal Vb, for example, when transition occurs, the logic state of the enable signal CNT_ENb output from the inverter 275 connected to the comparator 273 may transit from the first level to the second level.

Accordingly, the counter 283 may stop the count operation in response to the enable signal CNT_ENb having the second level and hold the digital code CNT_OUT corresponding to the count value at the transition point in time. The held digital code may be transmitted to another signal processing block, for example, an ISP.

In the normal mode, when analog to digital conversion with respect to a pixel signal Vpix output from the first pixel (for example, the N-th pixel) of the pixel array 211 is completed, the reset signal CNTRST may be output to the counter 283 of the code generator 280 before analog to digital conversion is performed with respect to a pixel signal Vpix output from the second pixel (for example, the (N+1)th or (N+2)th pixel) of the pixel array 211 to the node ND1. Thus, the counter 283 may be initialized.

FIG. 5B is a circuit diagram of an image pickup device including an ADC device 241, according to another embodiment of the present invention. A counter 283 of the code generator 280 may perform a reset operation or an initialization operation in response to a pulse-type reset signal CNTRST. A ramp signal generator 220' may generate a first ramp signal RAMP1 having a first inclination in response to the flag FLAG.

A CDS circuit 214' may include a switch SW1 and a plurality of capacitors, namely, capacitors C1 and C4. The CDS circuit 214' may perform CDS on a reset signal and an image signal output from the first pixel (for example, the N-th pixel) to generate a correlated double sampled analog signal in1.

The ADC 271 may compare the correlated double sampled analog signal in1 with the first ramp signal RAMP1 and generate an enable signal CNT_ENb corresponding to a result of the comparison.

The clock signal CNT_CLK may be supplied to the counter 283 of the code generator 280 from when the first ramp signal RAMP1 generated by the ramp signal generator 220' starts a downward ramp. At this time, the counter 283 starts counting the number of clock signals CNT_CLK in response to the enable signal CNT_ENb having a first level. The comparator 273 starts comparing the first ramp signal RAMP1 received via a first input terminal (for example, a (+) input terminal) with the correlated double sampled analog signal in1 received via a second input terminal (for example, a (−) input terminal). At this time, the ramp signal generator 220' may generate a downward ramp signal having a first inclination.

Since the level of the first ramp signal RAMP1 is higher than that of the correlated double sampled analog signal in1 until a transition point in time, a comparator 273 may generate a comparison signal having a second level, and an inverter 275 connected to the comparator 273 may supply the enable signal CNT_ENb having the first level to the counter 283. Thus, the counter 283 may count the number of clock signals CNT_CLK until the transition point in time and output a digital code CNT_OUT corresponding to a result of the counting.

However, as the first ramp signal RAMP1 performs a downward ramp, when the level of the correlated double sampled analog signal in1 is equal to or greater than the level of the first ramp signal RAMP1, for example, when transition occurs, the logic state of the enable signal CNT_ENb output from the inverter 275 connected to the comparator 273 may transit from the first level to the second level.

Accordingly, the counter 283 may stop the count operation at the transition point in time and may hold a count value generated at the transition point in time as the digital code CNT_OUT.

FIG. 5C is a circuit diagram of an image pickup device according to still another embodiment of the present invention. Referring to FIG. 5C, the image pickup device may include the pixel array 211 including a plurality of pixels, namely, N-th through (N+M)th pixels, connected to a single column C1, and a CDS/ADC device 241, and a ramp signal generator 220".

The CDS/ADC device 241 may include an ADC block 250, and a code generator 280. The ADC block 250 may include an ADC 271 for converting an analog signal output from the pixel array 211 into an enable signal, that is, a digital signal CNT_ENb, on the basis of a ramp signal RAMP1 or RAMP2 output from the ramp signal generator 220".

The code generator 280 may generate a digital code CNT_OUT on the basis of the clock signal CNT_CLK and the digital signal CNT_ENb output from the ADC block 250. A counter 283' of the code generator 280 may receive the enable signal CNT_ENb, the clock signal CNT_CLK, and an up/down signal UP/DN, and down-counts or up-counts the number of clock signals CNT_CLK on the basis of the enable signal CNT_ENb and the up/down signal UP/DN, thereby generating the digital code CNT_OUT.

For example, the counter 283' may perform a count operation in response to the enable signal CNT_ENb having a first level, stop the count operation in response to the enable signal CNT_ENb having a second level, and perform a reset operation or an initialization operation in response to the reset signal CNTRST.

While the enable signal CNT_ENb is kept in the first level, the counter 283' may perform a down-count operation in response to the up/down signal UP/DN having the first level and an up-count operation in response to the up/down signal UP/DN having the second level.

The code generator 280 according to the present embodiment may perform a count operation, for example, a down-count operation, in order to remove an error in analog to digital conversion generated due to an offset of the ramp signal RAMP1 or RAMP2. The code generator 280 may further include a calculation unit (not shown) for storing and outputting the digital code CNT_OUT output from the counter 283'. The calculation unit may perform a reset operation in response to the reset signal CNTRST.

Figure 6B:
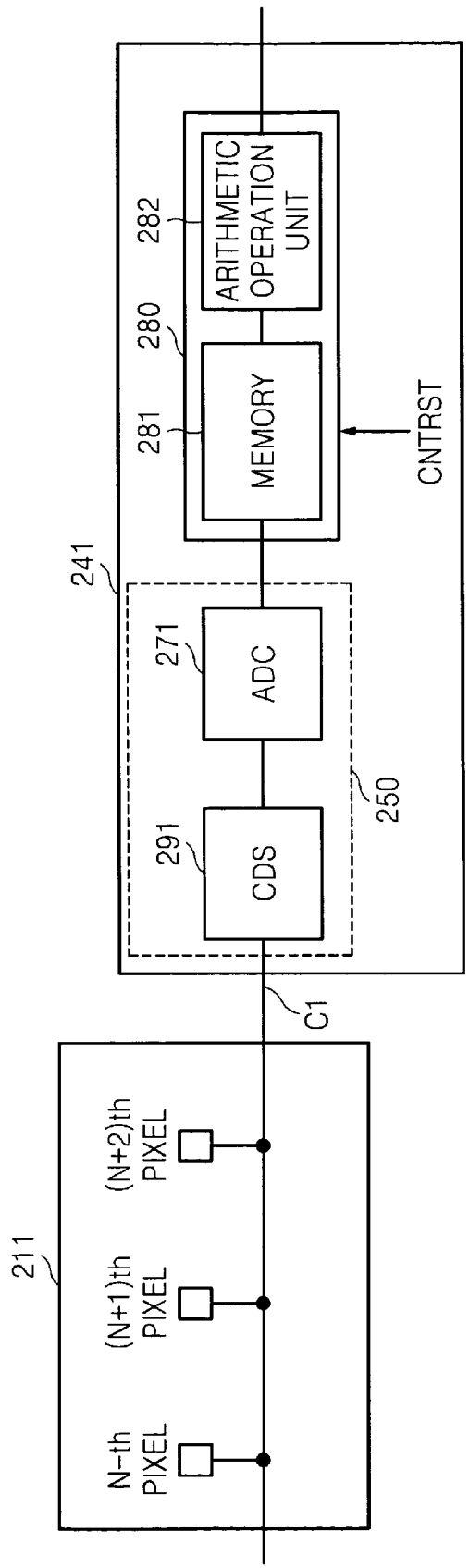
Figure 6C:
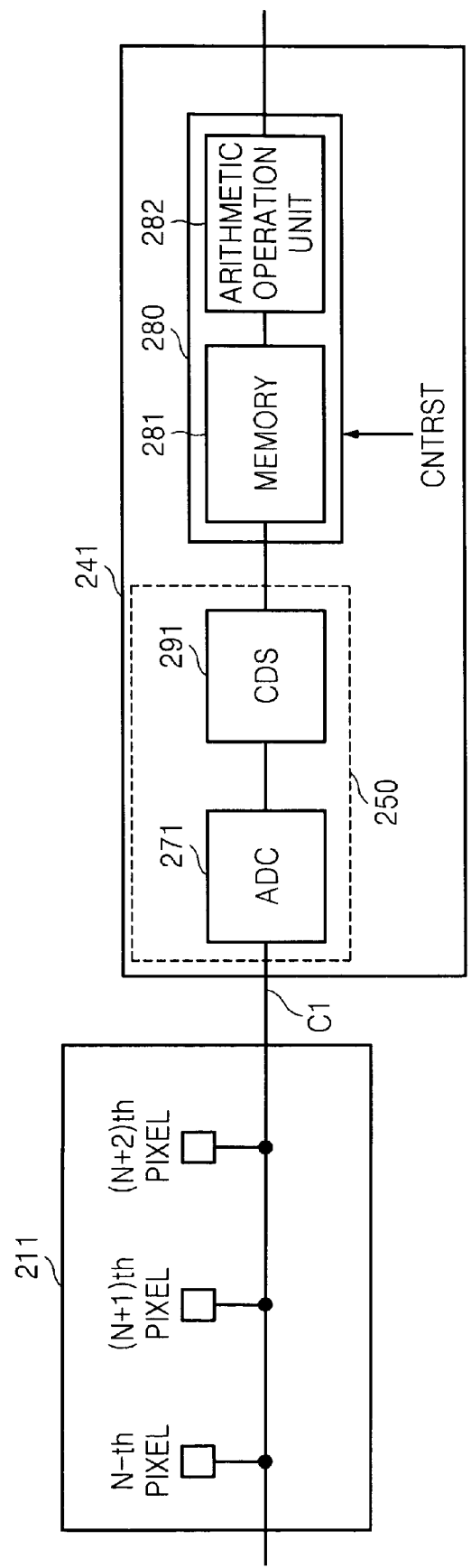

FIGS. 6A through 6C are schematic circuit diagrams of an image pickup device according to another embodiment of the present invention. FIG. 6A is a circuit diagram of an image pickup device according to another embodiment of the present invention. The image pickup (or capture) device according to the present embodiment may include a pixel array 211 and a CDS/ADC device 241.

The CDS/ADC device 241 may include an ADC 271 for converting an analog signal output from a pixel of the pixel array 211 into a digital signal, a digital CDS circuit 291 for performing CDS on the digital signal output from the ADC 271 to generate a correlated double sampled digital signal, and a digital code generator 280 for generating a digital code on the basis of the logic state of the correlated double sampled digital signal output from the digital CDS circuit 291.

A process of converting a first analog signal output from a first pixel (for example, an N-th pixel) into a first digital code in the average mode will now be described. The digital code generator 280 may perform a reset operation in response to the reset signal CNTRST. The ADC 271 may convert the first analog signal output from a first pixel (for example, an N-th pixel) into the first digital signal. The digital CDS circuit 291 may perform CDS on the first digital signal in order to generate a first CDS signal.

The digital code generator 280 may count the number of clock signals CNT_CLK from a count starting point in time, for example, from the point in time when the clock signal CNT_CLK is input, until when the logic state of the first CDS signal transits from the first level (for example, a low level or "0") to the second level (for example, a logic high level or "1"), that is, until a first transition point in time, and may hold a first digital code corresponding to a count value obtained at the first transition point in time.

A process of converting a second analog signal output from a second pixel (for example, an (N+2)th pixel) into a second digital code in the average mode will now be described. The ADC 271 may convert the second analog signal output from the second pixel into the second digital signal. The digital CDS circuit 291 may perform CDS on the second digital signal in order to generate a second CDS signal.

The digital code generator 280 may count the number of clock signals CNT_CLK by using the count value obtained at the count starting point in time, for example, at the point in time when the clock signal CNT_CLK is input, as a starting digital code, until when the logic state of the second CDS signal transits from the first level to the second level, and may output, as a final digital code, a second digital code corresponding to a count value obtained at the second transition point in time. When the analog to digital conversion operation on the second analog signal output from the second pixel is completed, the digital code generator 280 may perform a reset operation in response to the reset signal CNTRST.

In the normal mode, after analog to digital conversion operation on an analog signal output from each pixel is completed, the reset signal CNTRST may be generated. Thus, the code generator 280 may perform a reset operation in response to the reset signal CNTRST. However, in the average mode, even after the analog to digital conversion operation on the first analog signal output from the first pixel is completed, the reset signal CNTRST may not be generated. Thus, the code generator 280 may hold a digital code obtained at a transition point in time.

FIG. 6B is a circuit diagram of an image pickup device according to another embodiment of the present invention. The image pickup (or capture) device according to the present embodiment may include a CDS/ADC device 241 that performs analog to digital conversion operation according to a different method from a single slope ADC.

An ADC 271 of the CDS/ADC device 241 may be implemented into a sigma-delta ADC, a successive approximation ADC, a cyclic ADC, or a pipe lined ADC. In this case, an ADC block 250 may convert a pixel signal output from a first or second pixel into a digital code and output the digital code to a code generator 280.

For example, if the ADC block 250 is implemented into a successive approximation ADC, the ADC block 250 may convert the pixel signal output from the first or second pixel into the digital code by using a successive approximation register (not shown), which is a kind of a counter.

Referring to FIG. 6B, the image pickup device according to the present embodiment may include the pixel array 211 and the CDS/ADC device 241. The CDS/ADC device 241 may include a CDS circuit 291 for performing CDS on pixel signals output from the first and second pixels of the pixel array 211 to generate analog CDS signals, an ADC 271 for converting the analog CDS signals into digital codes, and the code generator 280 for performing an arithmetic operation (for example, a summation) on the digital codes output from the ADC 271.

The code generator 280 may include a memory 281 for storing at least one of the digital codes output from the ADC 271, and an arithmetic operation unit 282 for performing an arithmetic operation on the digital codes. For example, the arithmetic operation unit 282 may be implemented into an adder.

The first pixel (for example, an N-th pixel) may be selected from a plurality of pixels of the pixel array 211 that are connected to a column C1. Then, it may be determined whether a current mode is a normal mode or an average mode. The current mode may be selected by a user through a user interface of a display device of the image pickup device or through a mode selection device, for example, a button or a slide switch, of the image pickup device.

A process in which the CDS/ADC device 241 converts the pixel signal output from the first pixel into the first digital code when the current mode is a normal mode will now be described. The CDS circuit 291 may perform CDS on the pixel signal output from the first pixel to generate a first CDS signal. The ADC 271 may convert the first CDS signal into a first digital code. If the ADC 271 is implemented into a sigma-delta ADC, a successive approximation ADC, a cyclic ADC, or a pipe lined ADC, the ADC 271 may convert the first CDS signal into the first digital code.

The code generator 280 may output the first digital code output from the ADC 271. The code generator 280 may output the first digital code via the arithmetic operation unit 282 a predetermined period of time after storing the first digital code in the memory 281. The code generator 280 may perform a reset operation in response to the reset signal CNTRST.

An operation of the CDS/ADC device 241 when the current mode is an average mode will now be described. A process of converting the pixel signal output from the first pixel (for example, the N-th pixel) into the first digital code will be first described. The CDS circuit 291 may perform CDS on the pixel signal output from the first pixel to generate the first CDS signal. The ADC 271 may convert the first CDS signal into the first digital code. The first digital code may be stored (or latched) in the memory 281.

Then, a process of converting a pixel signal output from the second pixel into a second digital code will now be described. The second pixel (for example, an (N+2)th pixel) that shares the same column together with the first pixel may be selected. The CDS circuit 291 may perform CDS on the pixel signal output from the second pixel to generate a second CDS signal. The ADC 271 may convert the second CDS signal into a second digital code.

The arithmetic operation unit 282 may receive the first digital code stored in the memory 281 and the second digital code output from the ADC 271, perform an arithmetic operation, that is, a summation, on the first and second digital codes, and output as a final digital code a third digital code corresponding to a sum of the first and second digital codes. The code generator 280 may perform a reset operation in response to the reset signal CNTRST.

A microprocessor (not shown) of the image pickup device according to the present embodiment may determine whether the above-described analog to digital conversion operation on a frame is terminated, and may repeat the analog to digital conversion operation or terminate the analog to digital conversion operation according to a result of the determination.

As described above, the CDS/ADC device 241 may output as the final digital code a third digital code corresponding to a bit-wise sum of the first and second digital codes of the first and second pixels. As such, since the CDS/ADC device 241 according to the present embodiment may sum digital codes generated by analog to digital conversion performed on pixel signals output from at least two of a plurality of pixels included in a sampling region, in bit-wise, and output as the final digital code a digital code corresponding to a result of the summation, an image of the sampling region is averaged and displayed, thereby reducing distortion of the image.

FIG. 6C is a circuit diagram of an image pickup device according to another embodiment of the present invention. Referring to FIG. 6C, an CDS/ADC device 241 may include an ADC 271 for converting an analog signal output from a pixel of the pixel array 211 into a digital code, a CDS circuit 291 for performing CDS on the digital code to generate a correlated double sampled digital code, and a code generator 280 for performing an arithmetic operation (for example, a summation) on the correlated double sampled digital code in units of bits.

The code generator 280 may include a memory 281 for storing a correlated double sampled first digital code for a first pixel signal output from the CDS circuit 291, and an arithmetic operation unit 282 for performing an arithmetic operation on the correlated double sampled first digital code stored in the memory 281 and a correlated double sampled second digital code for a second pixel signal and outputting as a final digital code a third digital code corresponding to a result of the arithmetic operation.

In the average mode, the ADC 271 may convert a first analog signal output from the first pixel into a first digital signal and a second analog signal output from the second pixel into a second digital signal. The ADC 271 may be implemented into a sigma-delta ADC, a successive approximation ADC, a cyclic ADC, or a pipe lined ADC.

The CDS circuit 291 may perform CDS on the first digital signal to generate the correlated double sampled first digital code, and perform CDS on the second digital signal to generate the correlated double sampled second digital code.

The memory 281 may store the correlated double sampled first digital code, and the arithmetic operation unit 282 may sum the correlated double sampled first digital code stored in the memory 281 and the correlated double sampled second digital code output from the CDS circuit 291 in units of bits to generate the final digital code.

Figure 7:
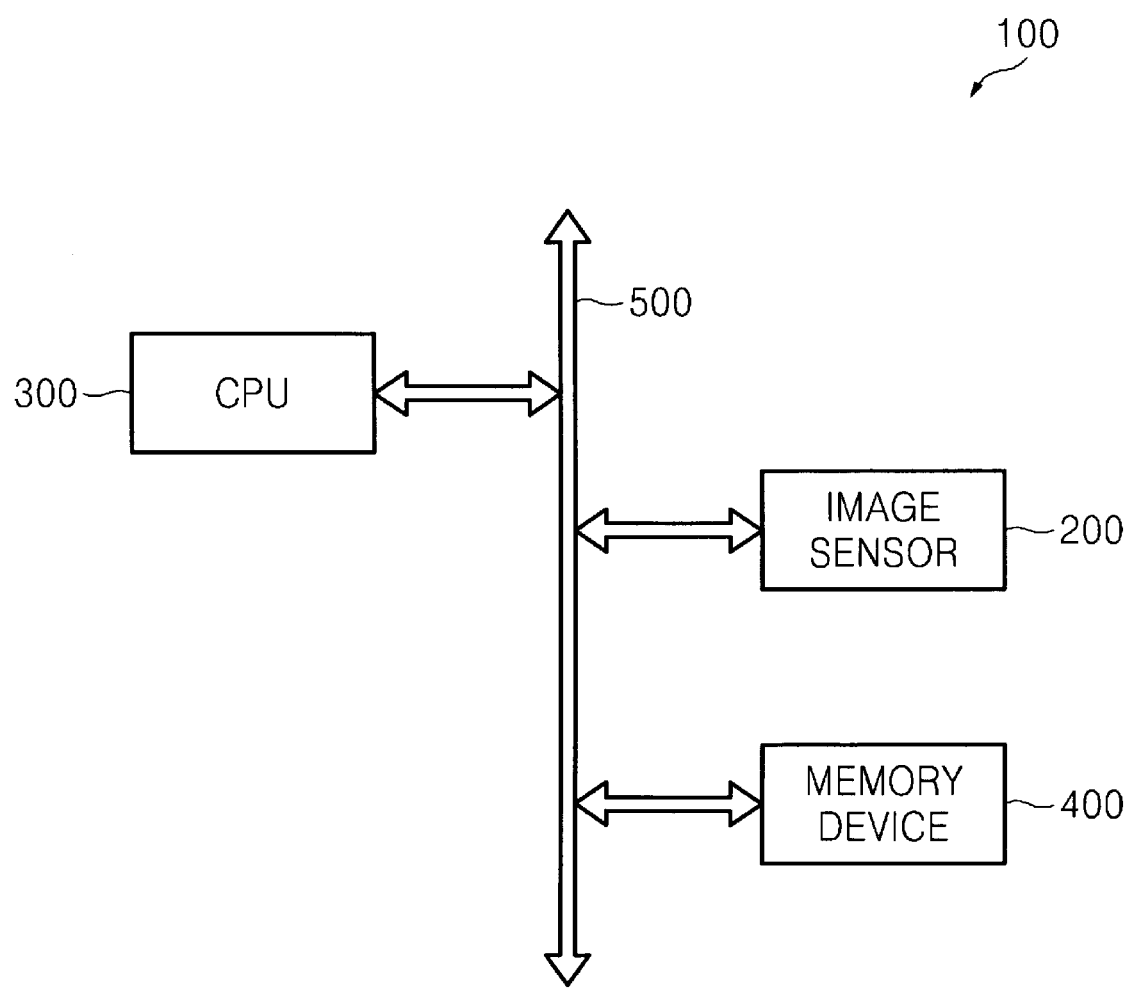
FIG. 7 is a schematic block diagram of an image pickup device including an image sensor, according to an embodiment of the present invention.

FIG. 7 is a schematic block diagram of a semiconductor system 100 including the image sensor 200 of FIG. 4, according to an embodiment of the present invention. The semiconductor system 100 may be a computer system, a camera system, a scanner, a mechanized clock system, a navigation system, a video phone, a management system, an auto focusing system, an operation-monitoring system, an image stabilization system, or the like, but various other systems may be used as the semiconductor system 100.

Referring to FIG. 7, the semiconductor system 100, which is a computer system, may include a bus 500, a central processing unit (CPU) 300, the image sensor 200, and a memory device 400. The semiconductor system 100 may further include an interface (not shown) that is connected to the bus 500 so as to communicate with the outside. The interface may be an input/output (I/O) interface or a wireless interface.

The CPU 510 may generate a control signal for controlling an operation of the image sensor 200, and provide the control signal to the image sensor 200 via the bus 500. The memory 400 may receive an image signal from the image sensor 200 via the bus 500 and store the image signal therein. The image sensor 200 may be integrated with the CPU 300, the memory 400, and the like. In some cases, the image sensor 200 may be integrated with a digital signal processor (DSP), or only the image sensor 200 may be integrated into a separate chip.

A noise removing method or an image sensing method according to an embodiment of the present invention can also be embodied as computer readable codes on a computer readable recording medium. The computer readable recording medium is any data storage device that can store data which can be thereafter read by a computer system.

An image sensor according to an embodiment of the present invention may achieve more precise and accurate image sensing by adaptively including a noise removing unit in each pixel.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An image sensor comprising:
    a photo sensitive device (PSD) configured to generate photocharges;
    a storage node configured to store photocharges generated by the PSD;
    a transfer switch connected between the PSD and the storage node, the transfer switch configured to control transfer of the photocharges generated by the PSD to the storage node in response to a transfer control signal; and
    a noise removing circuit connected to the PSD, the noise removing circuit configured to generate and store a noise signal by detecting an amount of the photocharges generated by the PSD during an inactive period, and configured to remove photocharge corresponding to a noise component from among the photocharges generated in the PSD during an active period based on the noise signal, the inactive period being a period during which the transfer switch does not transfer photocharges from the PSD, the active period being a period during which the transfer switch transfers photocharges from the PSD.

2. The image sensor of claim 1, wherein the noise removing circuit comprises:
    a storage unit configured to sample and store the photocharge corresponding to the noise component; and
    a noise removing unit configured to remove the photocharge corresponding to the noise component from among the photocharges generated in the PSD based on the sampled photocharge stored in the storage unit, in response to a control signal.

3. The image sensor of claim 1, wherein the image sensor includes a plurality of pixels,
    wherein the noise removing circuit is installed in each of the plurality of pixels or is shared by pixels from among the plurality of pixels.

4. The image sensor of claim 2, wherein the storage unit comprises at least one capacitor configured to store the photocharge corresponding to the noise component.

5. The image sensor of claim 2, wherein the noise removing unit comprises at least one transistor that is configured to be turned on/off in response to the control signal.

6. The image sensor of claim 5, wherein the noise removing unit comprises:
    a first transistor configured to turn on/off a path between the PSD and the storage unit in response to the control signal; and
    a second transistor electrically coupled to the first transistor, and configured to adjust an amount of current in response to an amplitude of a voltage applied to the storage unit.

7. The image sensor of claim 5, wherein the control signal is configured to be enabled during a period of time that corresponds to a unit of time during which a sensing operation is performed in the image sensor.

8. An image pickup device comprising:
    an image sensor comprising a plurality of pixels and a control unit configured to control the plurality of pixels;
    a central processing unit (CPU) configured to control an operation of the image sensor; and
    a memory device configured to store an image provided from the image sensor under the control of the CPU,
    wherein each of the plurality of pixels include
        a photo sensitive device (PSD) configured to generate photocharges,
        a storage node configured to store photocharges generated by the PSD,
        a transfer switch connected between the PSD and the storage node, the transfer switch configured to control transfer of the photocharges generated by the PSD to the storage node in response to a transfer control signal; and
        a noise removing circuit connected to the PSD, the noise removing circuit configured to generate and store a noise signal by detecting an amount of the photocharges generated by the PSD during an inactive period, and configured to remove photocharge corresponding to a noise component from among the photocharges generated in the PSD during an active period based on the noise signal, the inactive period being a period during which the transfer switch does not transfer photocharges from the PSD, the active period being a period during which the transfer switch transfers photocharges from the PSD.

9. The image pickup device of claim 8, wherein the noise removing circuit comprises:
    a storage unit configured to sample and store the photocharge corresponding to the noise component; and
    a noise removing unit configured to remove the noise component from among the photocharges generated in the PSD based on the sampled photocharge stored in the storage unit, in response to a control signal generated by the control unit.

10. The image pickup device claim 8, wherein the storage unit comprises at least one capacitor configured to store the photocharge corresponding to the noise component.

11. The image pickup device of claim 8, wherein the noise removing unit comprises at least one transistor that is configured to be turned on/off in response to the control signal.

12. The image pickup device of claim 11, wherein the noise removing unit comprises:
    a first transistor configured to turn on/off a path between the PSD and the storage unit in response to the control signal; and
    a second transistor connected to the first transistor, and configured to adjust an amount of current in response to an amplitude of a voltage applied to the storage unit.

13. The image sensor of claim 11, wherein the control signal is configured to be enabled during a period of time that corresponds to a unit of time during which a sensing operation is performed in the image sensor.

* * * * *